(12) United States Patent
Dinger et al.

(10) Patent No.: US 10,393,222 B2
(45) Date of Patent: Aug. 27, 2019

(54) CENTRIFUGAL PENDULUM

(71) Applicant: Schaeffler Technologies AG & Co. KG, Herzogenaurach (DE)

(72) Inventors: Christian Dinger, Lauf (DE); Jan Hoffmann, Rastatt (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 254 days.

(21) Appl. No.: 15/300,689

(22) PCT Filed: Mar. 31, 2015

(86) PCT No.: PCT/DE2015/200239
§ 371 (c)(1),
(2) Date: Sep. 29, 2016

(87) PCT Pub. No.: WO2015/149802
PCT Pub. Date: Oct. 8, 2015

(65) Prior Publication Data
US 2017/0108078 A1    Apr. 20, 2017

(30) Foreign Application Priority Data

Apr. 1, 2014  (DE) ........................ 10 2014 206 104

(51) Int. Cl.
*F16F 15/14*  (2006.01)

(52) U.S. Cl.
CPC ........ *F16F 15/145* (2013.01); *F16F 15/1414* (2013.01)

(58) Field of Classification Search
CPC .. F16F 15/145; F16F 15/1464; F16F 15/1471; F16F 15/1407; F16F 15/14;
(Continued)

(56) References Cited

U.S. PATENT DOCUMENTS

| 7,484,434 B2 * | 2/2009 | Jung | ................. F16F 15/13438 |
| | | | 74/574.4 |
| 8,863,892 B2 * | 10/2014 | Kombowski | ........ G10K 11/002 |
| | | | 181/207 |

(Continued)

FOREIGN PATENT DOCUMENTS

| DE | 102009042812 | 5/2010 |
| DE | 102011004443 | 8/2012 |

(Continued)

*Primary Examiner* — Daniel D Yabut
(74) *Attorney, Agent, or Firm* — Davidson, Davidson & Kappel, LLC (57) ABSTRACT

A centrifugal pendulum having a pendulum flange, a first pendulum mass and a second pendulum mass and a spring arrangement, wherein the first pendulum mass and the second pendulum mass are positioned side-by-side in the circumferential direction, wherein the first pendulum mass is coupled with the pendulum flange by a first slotted guide and the second pendulum mass is coupled with the pendulum flange by a second slotted guide. The first slotted guide guides the first pendulum mass along a first oscillation path and the second slotted guide guides the second pendulum mass along a second oscillation path in an oscillating motion. The spring arrangement at least partially couples the first pendulum mass with the second pendulum mass, wherein at least one of the two pendulum masses has a receptacle. The spring arrangement includes a spring element and a protective device, wherein the protective device is positioned at least partially in the receptacle of the pendulum mass.

20 Claims, 4 Drawing Sheets

(58) Field of Classification Search
CPC .. F16F 15/1421; F16F 15/1414; F16F 15/283; F16F 15/223; F16F 15/31; F16F 15/1315; F16F 15/13438; F16F 15/12326; F16D 3/79; F16H 41/00; F16H 41/24; F16H 55/14
See application file for complete search history.

(56) References Cited

U.S. PATENT DOCUMENTS

| | | | |
|---|---|---|---|
| 9,328,796 B2 * | 5/2016 | Movlazada | F16F 15/145 |
| 2006/0032717 A1 * | 2/2006 | Jee | F16F 15/13438 |
| | | | 188/379 |
| 2009/0088261 A1 * | 4/2009 | Clark | F16F 15/12326 |
| | | | 464/68.1 |

FOREIGN PATENT DOCUMENTS

| | | |
|---|---|---|
| DE | 102014210489 | 12/2014 |
| DE | 102014216540 | 3/2015 |
| WO | WO2014005907 | 1/2014 |
| WO | WO2014180475 | 11/2014 |

\* cited by examiner

CENTRIFUGAL PENDULUM

CROSS-REFERENCE TO RELATED APPLICATIONS

This application is the U.S. National Phase of PCT/DE2015/200239 filed Mar. 31, 2015, which claims priority to DE 10 2014 206 104.0 filed Apr. 1, 2014, the entire disclosures of which are incorporated by reference herein.

The invention relates to a centrifugal pendulum.

BACKGROUND

Centrifugal pendulums having a pendulum flange that is rotatable around an axis of rotation and a plurality of pendulum masses distributed around the circumference that are pivotable to a limited extent relative to the pendulum flange are known.

SUMMARY OF THE INVENTION

It is an object of the present invention to provide an improved centrifugal pendulum.

According to the invention it has been recognized that an improved centrifugal pendulum can be provided by the centrifugal pendulum being mountable rotatably around an axis of rotation and having a pendulum flange, a first pendulum mass and a second pendulum mass, as well as a spring arrangement. The first pendulum mass and the second pendulum mass are positioned side-by-side in the circumferential direction. The first pendulum mass is coupled with the pendulum flange by means of a first slotted guide, and the second pendulum mass is coupled with the pendulum flange by means of a second slotted guide. The first slotted guide is designed to guide the first pendulum mass along a first oscillation path in an oscillating motion, and the second slotted guide is designed to guide the second pendulum mass along a second oscillation path in an oscillating motion. The spring arrangement is positioned between the two pendulum masses in the circumferential direction, and couples the first pendulum mass at least partially with the second pendulum mass. Furthermore, at least one of the two pendulum masses includes a receptacle. The spring device comprises at least one spring element and a protective device, the protective device being positioned at least partially in the receptacle of the pendulum mass.

This ensures that abrasion between the spring element and the receptacle in the pendulum mass is prevented. This prevents wear on the spring arrangement and/or the receptacle of the pendulum mass, so that entry of particles into a liquid coolant of the drive assembly is prevented.

In another embodiment, at least one of the two pendulum masses includes a fastening segment. The fastening segment extends at least partially in the circumferential direction. The protective device is designed at least partially in the form of a hollow body, the spring element at least partially surrounding and gripping the protective device circumferentially. The protective device at least partially surrounds and grips the fastening segment with an inner circumferential surface. As this is done, the protective device is connected by its inner circumferential surface to the fastening segment, preferably positively and/or frictionally. In this way, the position of the spring arrangement can be reliably secured, and at the same time direct contact of the spring element with the pendulum mass can be avoided.

In another embodiment, the protective device includes a first segment and a second segment, the first segment reaching into the receptacle and providing a connection of the protective device to the receptacle while the second segment is at least partially peg-shaped.

In another embodiment, the first segment includes an eyelet, while the protective device has a pin and a cutout positioned in the pendulum mass, designed to correspond to the pin. The cutout in the pendulum mass is preferably aligned parallel to the axis of rotation. The pin extends through the cutout in the pendulum mass and the eyelet, and connects the protective device to the pendulum mass positively. This ensures that the protective device is able to have additional freedom of movement on the pendulum mass.

In another embodiment, the protective device includes a first protective element and a second protective element, the first protective element having the first segment and the second segment, while the second protective element is designed at least partially in the form of a hollow body and surrounds the second segment of the first protective element circumferentially. This enables the first protective element and the second protective element to be joined together in a simple manner.

In another embodiment, the protective device includes a third segment, the second segment being positioned between the first segment and the third segment in the circumferential direction. The first pendulum mass has the receptacle, and the second pendulum mass has an additional receptacle positioned opposite the first pendulum mass in the circumferential direction. The first protective element reaches into the receptacle with its first segment and is joined with the receptacle by means of a positive and/or frictional connection. The spring element surrounds the second segment circumferentially. The third segment reaches into the additional receptacle with free play, and is designed to enable movement of the additional receptacle relative to the third segment. This ensures that the spring element is guided in the radial direction, and that at the same time an oscillating motion of the pendulum masses relative to each other is made possible.

In another embodiment, the protective device has a transverse segment. The transverse segment extends at least partially in the radial direction, the transverse segment preferably being positioned between the spring element and the pendulum mass in the circumferential direction. This prevents a direct contact of a longitudinal end of the spring element with the pendulum mass.

In another embodiment, the receptacle has a recess, the recess being designed to correspond to the transverse segment and at least partially accommodating the transverse segment. This ensures a positive connection between the protective device and the pendulum mass in a simple manner.

In another embodiment, to delimit the receptacle the pendulum mass has at least one bracing element, which is positioned radially to the outside of the spring element. The bracing element has an inside surface. The inside surface is tangential to an outer circumferential surface of the spring element. This prevents or minimizes abrasion on the pendulum mass or the spring element when the spring element moves relative to the pendulum mass.

In another embodiment, the spring element at least partially surrounds the protective device circumferentially, and/or the protective device surrounds the spring element circumferentially. In this way, a simple frictional connection between the protective device and the spring element can be ensured.

BRIEF DESCRIPTION OF THE DRAWINGS

The invention will be explained in greater detail below on the basis of figures. The figures show the following.

DETAILED DESCRIPTION

Figure 1:
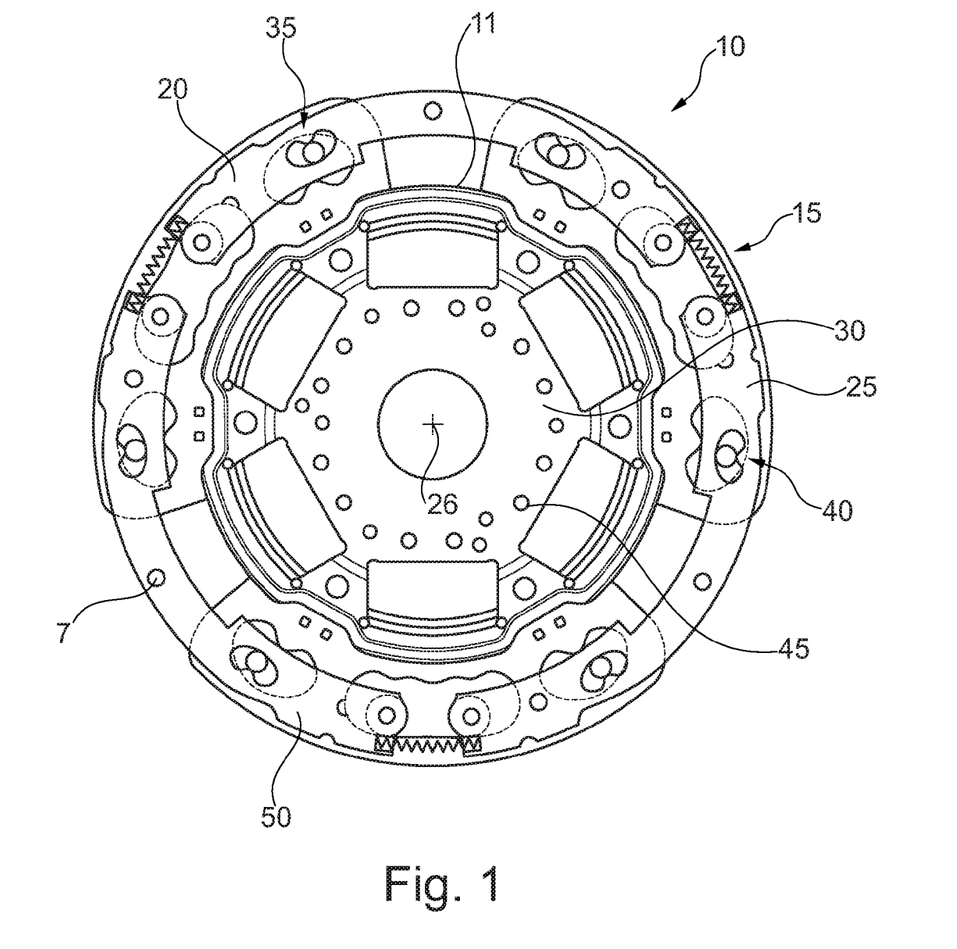
FIG. 1 a top view of a centrifugal pendulum having a spring arrangement according to a first embodiment.
Figure 2:
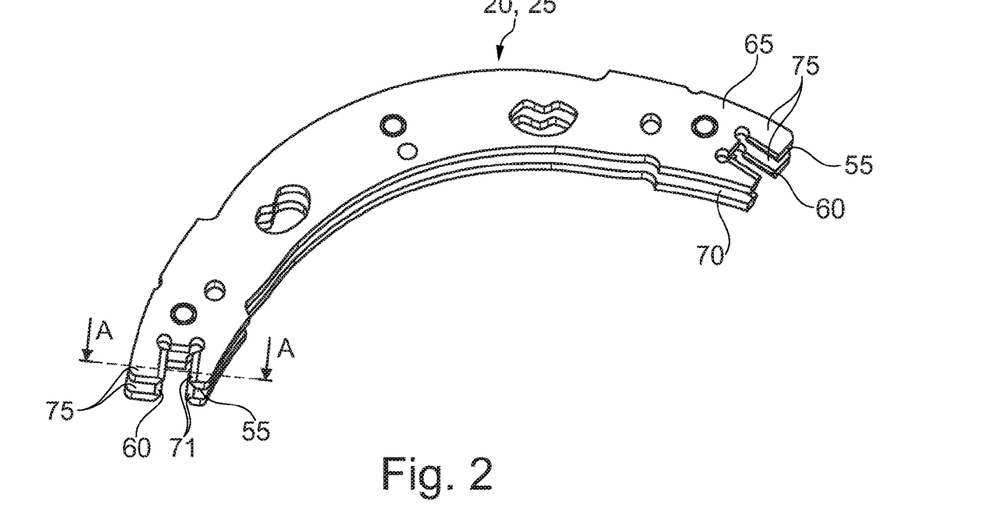
FIG. 2 a perspective view of a pendulum mass of the centrifugal pendulum shown in FIG. 1.
Figure 3:
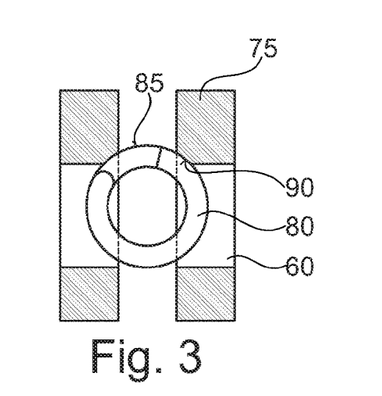
FIG. 3 a sectional view through the pendulum mass shown in FIG. 2 along a sectional plane A-A shown in FIG. 2.

FIG. 1 shows a top view of a centrifugal pendulum 10 having a spring arrangement 15 according to a first embodiment. FIG. 2 shows a perspective view of a pendulum mass 20 of the centrifugal pendulum 10 shown in FIG. 1. FIG. 3 shows a sectional view through the pendulum mass 20, 25 of the centrifugal pendulum 10 shown in FIG. 1. FIG. 3 shows a sectional view through the pendulum mass 20, 25 shown in FIG. 2 along a sectional plane A-A shown in FIG. 2.

The centrifugal pendulum 10 is rotatable around an axis of rotation 26. In this case, the centrifugal pendulum 10 may be part of a drivetrain (not shown) of a motor vehicle, in order to cancel out torsional vibrations in the drivetrain.

The centrifugal pendulum 10 has a pendulum flange 30 and the pendulum masses 20, 25 shown in FIG. 2. A first pendulum mass 20 is positioned adjacent to a second pendulum mass 25 in the circumferential direction. The pendulum masses 20, 25 are each coupled with the pendulum flange 30 by means of a slotted guide 35, 40. In this case, a slotted guide 35 guides the first pendulum mass 20 in an oscillating motion along a first oscillation path. The second slotted guide 40 guides the second pendulum mass 25 in an oscillating motion along a second oscillation path, so that the pendulum masses 20, 25 are movable to a limited degree relative to the pendulum flange 30. Depending on the design of the slotted guides 35, 40, the oscillation paths may be identical or may differ from each other.

The pendulum flange 30 is connectible to additional components of the drivetrain by means of openings 45. In particular, it is possible for the pendulum flange 30 to be connected to a torque transfer device, for example a torsional vibration damper.

Along with the two pendulum masses 20, 25, it is also possible for at least one additional pendulum mass 50, as shown in FIG. 1, to be provided, which is positioned bordering on the first or second pendulum mass 20, 25 in the circumferential direction. The additional pendulum mass 50 is identical in design to the first and/or second pendulum mass 20, 25, and is coupled with the pendulum flange 30 by means of an additional slotted guide 35, 40 in order to guide the additional pendulum mass 50 along an additional oscillation path.

The pendulum masses 20, 25 each have a receptacle 60 on a lateral face 55 running in the radial direction. In this embodiment, the receptacle 60 is provided on both sides in the circumferential directions of the two pendulum masses 20, 25. It is of course also possible for the receptacle 60 to be provided on only one lateral face 55 of the pendulum masses 20, 25.

In this embodiment, the pendulum mass 20, 25, 50 has a first pendulum mass part 65 and a second pendulum mass part 70. The first pendulum mass part 65 and the second pendulum mass part 70 are positioned on both sides of the pendulum flange 30. It is of course also possible for the pendulum mass 20, 25 to be designed in a single piece, and for the pendulum flange 30 to surround the pendulum mass 20, 25 in the axial direction on both sides.

The receptacle 60 in this embodiment is formed by the two pendulum mass parts 65, 70 to the effect that in each case an essentially rectilinear recess opening 71 in each of the pendulum mass parts 65, 70 extends from the lateral face 55 in the circumferential direction. The recess opening 71 thereby forms a bracing element 75 radially to the outside of the receptacle 60.

The spring arrangement 15 has a spring element 80. The spring element 80 is designed in this embodiment as a coil spring, and extends in an essentially circumferential direction. The spring element 80 has an outer circumferential surface 85. The bracing element 75 has an inside surface 90 radially on the outer side. The inside surface 90 is aligned tangentially to the outer circumferential surface 85 of the spring element 80. In this way, cutting of an edge of the bracing element 75 into the spring element 80 is avoided. Also avoided thereby is the inside surface 90 of the bracing element 75 being abraded on the inner side by the movement of the spring element 80 when the spring element 80 moves relative to the bracing element 75, so that an introduction of particles into an oil circuit of the drive system is prevented.

In this embodiment, the bracing elements 75 extend radially from inside to outside, and are rectangular. The inside surface 90 is formed by a bevel. Other forms are of course also possible.

Figure 4:
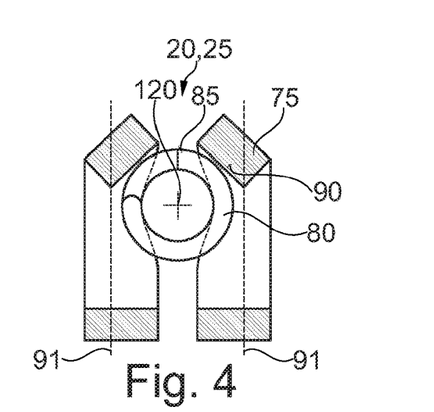
FIG. 4 a variant of the embodiment of the pendulum mass shown in FIG. 3.

FIG. 4 shows a variant of the embodiment of the pendulum mass 20, 25 shown in FIG. 3. In contrast thereto, the bracing element 75 is positioned obliquely in relation to a plane 91 that is perpendicular to the axis of rotation 26. This enables the inside surface 90 to also be positioned tangentially to the outer circumferential surface 85 of the spring element 80. In comparison to the embodiment shown in FIG. 3, the bracing element 75 can be matched to the form of the spring element 80 in a simple way in a bending process.

Figure 5:
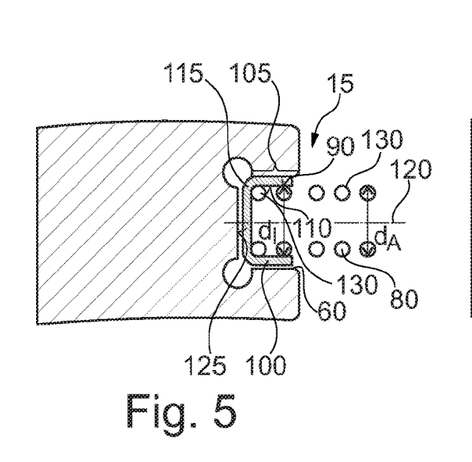
FIG. 5 a cross section through a centrifugal pendulum having a spring arrangement according to a second embodiment.

FIG. 5 shows a cross section through a centrifugal pendulum 10 having a spring arrangement 15 according to a second embodiment; the spring arrangement 15 is similar in design to the spring arrangement 15 shown in FIGS. 1 through 4. In addition, the spring arrangement 15 has a protective device 100 against the spring element 80. The protective device 100 in this embodiment is pot-shaped, and is positioned in the receptacle 60. In this embodiment, the protective device 100 has a hollow cylindrical segment 105. The segment 105 surrounds and grips the spring element 80 with an inner circumferential surface. An inside diameter dI of the segment 105 is chosen here so that the inside diameter dI is smaller than an outside diameter dA of the spring element 80. This causes the spring element 80 to be clamped in the protective device 100, so that the protective device 100 is joined frictionally with the spring element 80.

Furthermore, the protective device 100 has a transverse segment 115. The transverse segment 115 is positioned transversely to a longitudinal axis 120 of the spring element 80. The longitudinal axis 120 extends at least partially tangentially to the axis of rotation 26. The transverse segment 115 positioned between a receptacle floor 125 of the receptacle 60 and a longitudinal end 130 of the spring element 80.

Figure 6:
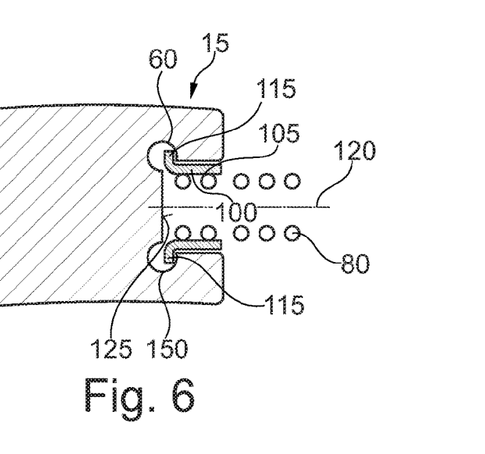
FIG. 6 a cross section through a centrifugal pendulum having a spring arrangement according to a third embodiment.

FIG. 6 shows a cross section through a centrifugal pendulum 10 having a spring arrangement 15 according to a third embodiment. The spring arrangement 15 is essentially similar in design to the form shown in FIG. 5. Differing therefrom, the transverse segment 115 extends radially outward in reference to the longitudinal axis 120 of the spring element 80, and forms a collar in relation to the segment 105. The receptacle 60 has a recess 150 bordering on the receptacle floor 125 radially to the inside and radially to the outside. The form of the recess 150 corresponds to the transverse segment 115. The transverse segment 115 protrudes into the recess 150, so that the protective device 100 is prevented from slipping out of the receptacle 60 by a positive lock between the recess 150 and the transverse segment 115.

Figure 7:
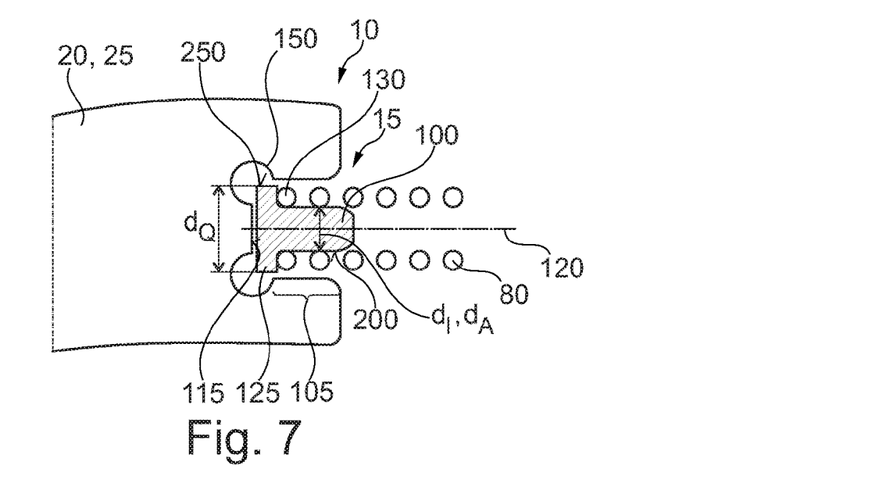
FIG. 7 a cross section through a centrifugal pendulum having a spring arrangement according to a fourth embodiment.

FIG. 7 shows a cross section through a centrifugal pendulum 10 having a spring arrangement 15 according to a fourth embodiment. The spring arrangement 15 is similar in design to the embodiment of the spring arrangement shown in FIG. 6. Differing therefrom, instead of the hollow cylindrical form of the segment 105 it now has a peg-shaped design, and is now surrounded on an outer circumferential surface 200 of the segment 105 by the spring element 80. Between the receptacle floor 125 and the segment 105 the transverse segment 115 is provided just as shown in FIG. 6. An outside diameter dQ of the transverse segment 115 is greater than an outside diameter dA of the segment 105. In this embodiment, the transverse segment 115 does not protrude into the recesses 150. It is of course also possible for the transverse segment 115 to protrude into the recess 150 with its free end 250, in order to thereby provide a positive lock between the protective device 100 and the pendulum masses 20, 25, as shown in FIG. 6.

To fix the protective device 100 on the spring element 80, the outside diameter dA of the segment 105 is greater than an inside diameter dI of the spring element 80 in the region of the segment 105. This fastens the spring element 80 onto the protective device 100 by means of a frictional lock. The transverse segment 115 is positioned between the receptacle floor 125 and the longitudinal end 130 of the spring element 80 in the longitudinal direction in reference to the longitudinal axis 120, so that, as shown in FIG. 5, a direct contact of the spring element 80 with the receptacle floor 125 is likewise avoided.

Figure 8:
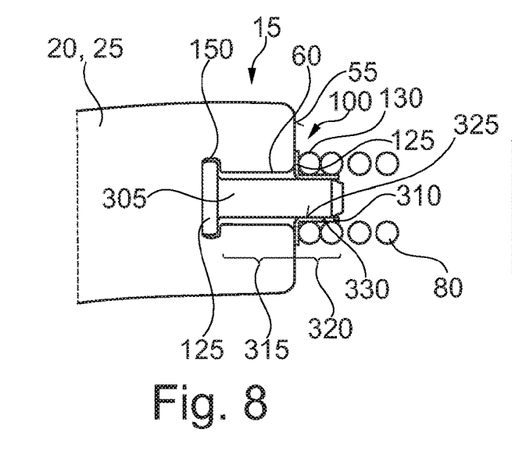
FIG. 8 a cross section through a centrifugal pendulum having a spring arrangement according to a fifth embodiment.

FIG. 8 shows a cross section through a centrifugal pendulum 10 having a spring arrangement 15 according to a fifth embodiment. The protective device 100 comprises a first protective element 305 and a second protective element 310. The first protective element 305 has a first segment 315 and a second segment 320. The first segment 315 reaches into the receptacle 60 and provides a positive lock with the receptacle 60. To this end, the first segment 315 is designed similar to the protective device 100 shown in FIG. 7. On the longitudinal end positioned in the receptacle 60, the first segment 315 has the transverse segment 115, which reaches into the recesses 150 at each of its free ends 250 and thus provides a positive lock between the first segment 315 and the recess 150. In addition, it is possible for the first protective element 305 to be fastened frictionally in the receptacle 60 in the region between the second segment 320 and the transverse segment 115.

The second segment 320 is peg-shaped, and protrudes out of the receptacle 60 in the direction of the pendulum mass 20, 25 located opposite. The second segment 320 is surrounded circumferentially by the second protective element 310. In this case, the second protective element is analogous in design to the protective device 100 shown in FIG. 6. The second protective element 310 thus has the transverse segment 125 which is located between the longitudinal end 130 of the spring element 80 and the lateral face 55 of the pendulum mass 20, 25. The second protective element 310 in this embodiment is joined to the first protective element 305 by means of a frictional lock. It is of course also possible for the second protective element 310 to be joined to the first protective element 305 by means of a frictional lock and/or a material connection. Furthermore, the segment 105 of the second protective element 310 prevents an inner circumferential surface 325 of the spring element 80 from rubbing on an outer circumferential surface 330 of the first protective element 305.

Figure 9:
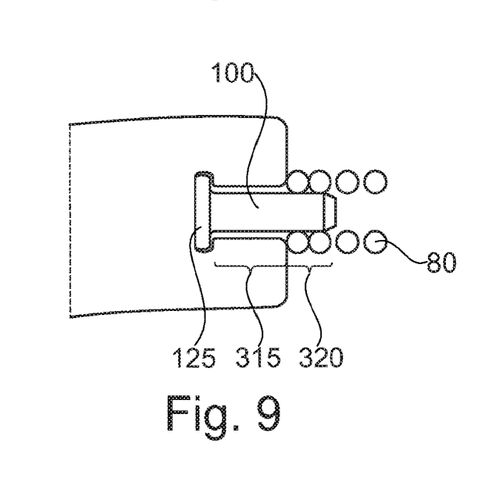
FIG. 9 a cross section through a centrifugal pendulum having a spring arrangement according to a sixth embodiment.

FIG. 9 shows a cross section through a centrifugal pendulum 10 having a spring arrangement 15 according to a sixth embodiment. The spring arrangement is essentially identical in design to the embodiment shown in FIG. 8. Differing therefrom, the second protective element 310 has been dispensed with, so that the second segment 320 is surrounded circumferentially by the spring element 80.

Figure 10:
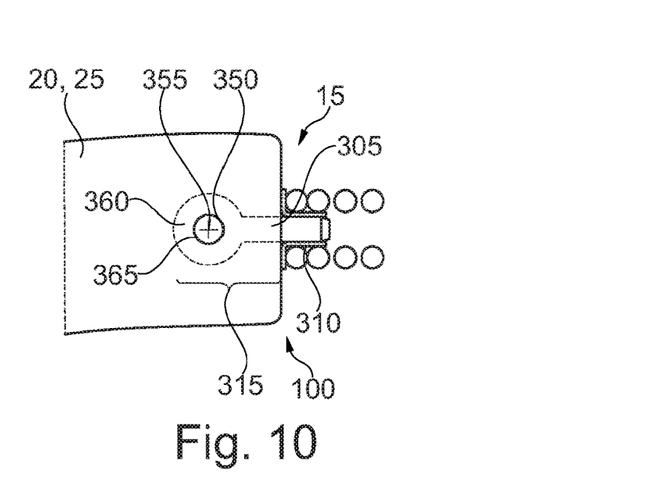
FIG. 10 a cross section through a centrifugal pendulum having a spring arrangement according to a seventh embodiment.

FIG. 10 shows a cross section through a centrifugal pendulum 10 having a spring arrangement 15 according to a seventh embodiment. The protective device 100 of the spring arrangement 15 is similar in design to the embodiment shown in FIG. 8. Differing therefrom, the first protective element 305 in the first segment 315 has an eyelet 350. The eyelet 350 has an eyelet axis 355, which is positioned parallel to the axis of rotation 26. An additional recess 360 is provided in the pendulum mass 20, 25. Furthermore, the protective device 100 includes a pin 365. The pin 365 and the additional recesses 360 in the pendulum mass parts 65, 70 are matched to correspond to each other. The eyelet 350 is also matched to the pin 365. The pin 365 extends both through the additional recess 360 and through the eyelet 350 along the eyelet axis 355, so that there is a positive lock between the first protective element 305 and the pendulum mass 20, 25. This ensures that the first protective element 305 can be tilted relative to the eyelet axis 355.

The second protective element 310 and the spring arrangement 15 are identical in design to the form shown in FIG. 8.

Figure 11:
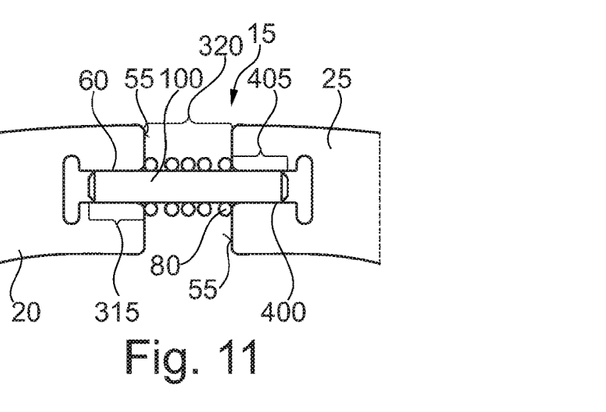
FIG. 11 a cross section through a centrifugal pendulum having a spring arrangement according to an eighth embodiment.

FIG. 11 shows a cross section through a centrifugal pendulum 10 having a spring arrangement 15 according to an eighth embodiment. In this case, the first pendulum mass 20 has the receptacle 60, as explained already in the preceding figures. The second pendulum mass 25 has an additional receptacle 400. The additional receptacle 400 is positioned essentially opposite the first receptacle 60 in the circumferential direction. The protective device 100 is designed essentially in the form of a pin. The first segment 315 is positioned in the first receptacle 60, as shown in FIGS. 8 and 9. Positioned in the additional receptacle 400 is a third segment 405 of the protective device 100. Provided between the first segment 315 and the third segment 405 in the circumferential direction is the second segment 320, which is surrounded circumferentially by the spring element 80. In this case, the spring element 80 extends completely between the two lateral faces 55 of the two pendulum masses 20, 25. In the first segment 315, the protective device 100 is connected to the first pendulum mass 20 frictionally, for example by means of a press fit. The third segment 405 and the additional receptacle 400 are provided with play, so that the third segment 405 can move in the additional receptacle relative to the second pendulum mass 25. This is important in particular when the two pendulum masses 20, 25 are vibrating oppositely and thus are not oscillating in synchrony.

Figure 12:
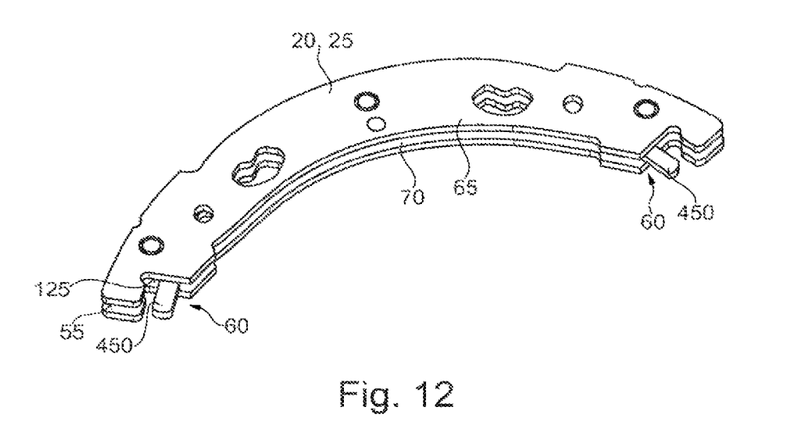
FIG. 12 a perspective view of a variant of the pendulum mass shown in FIG. 2.
Figure 13:
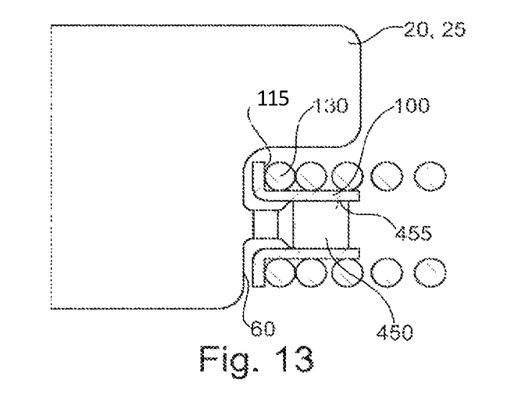
FIG. 13 a cross section through a centrifugal pendulum having a spring arrangement according to a ninth embodiment, having the pendulum mass shown in FIG. 12.

FIG. 12 shows a perspective view of a variant of the pendulum masses 20, 25 shown in FIG. 2. FIG. 13 shows a cross section through a centrifugal pendulum 10 having a spring arrangement 15 according to a ninth embodiment, having the pendulum mass 20, 25 shown in FIG. 12. The pendulum masses 20, 25 are modified from the pendulum masses 20, 25 shown in FIG. 2, to the effect that they each include a fastening segment 450 in a receptacle 60, which is peg-shaped and extends from the receptacle floor in the direction of the nearest pendulum mass 20, 25 in the circumferential direction. In this embodiment, a fastening segment 450 is provided for every receptacle. The fastening segment 450 is positioned diagonally relative to the two pendulum mass parts 65, 70, on the respective receptacle 60 provided on the lateral faces 55. The receptacle 60 is open radially inward. The spring arrangement 15 is fixed in the receptacle 60 to the effect that the protective device 100 is formed, for example, in FIG. 6, and surrounds the fastening segment 450 with an inner circumferential surface 455. At the same time, the protective segment 100 is matched in segment 105 to the fastening segment 450 in such a way that the protective device 100 is connected frictionally to the fastening segment 450. Here too, the transverse segment 115 separates the longitudinal end 130 of the spring element 80 from the receptacle floor 125.

In these embodiments, the protective device 100 may have an elastomer, for example, as its material. It is especially advantageous here in the embodiment shown in FIGS. 9 and 10 that the first protective element 305 may have a metallic material, for example, while on the other hand the second protective element 310 may have an elastomeric material. This makes it possible both to ensure a reliable fixing of the spring element 80 on the pendulum mass 20, 25, and at the same time to prevent wear of the spring element 80 on the pendulum mass 20, 25 because of the second protective element 310 made of the elastomer.

Let it be pointed out that the embodiments shown in FIGS. 1 through 13 may of course combine their features with one another. Thus it is possible, for example, for the receptacle 60 to also be formed in the pendulum mass 20, 25 shown in FIG. 12 as shown in FIGS. 3 and 4. It is also possible, in addition to the frictional connection of the first segment 315 shown in FIG. 11, to also draw on the form of the first segment 315 shown in FIG. 8.

REFERENCE LABELS 10 centrifugal pendulum
15 spring arrangement
20 first pendulum mass
25 second pendulum mass
26 axis of rotation
30 pendulum flange
35 first slotted guide
40 second slotted guide
45 Opening
50 additional pendulum mass
55 lateral face
60 receptacle
65 first pendulum mass part
70 second pendulum mass part
71 recess opening
75 bracing element
80 spring element
85 outer circumferential surface
90 inside surface
91 Plane
100 protective device
105 Segment
110 inner circumferential surface
115 transverse segment
120 longitudinal axis
125 receptacle floor
130 longitudinal end
150 Recess
200 outer circumferential surface
250 free end
305 first protective element
310 second protective element
315 first segment
320 second segment
325 inner circumferential surface of the spring element
330 outer circumferential surface of the protective element
350 Eyelet
355 eyelet axis
360 Recess
365 Pin
400 additional receptacle
405 third segment
450 fastening segment
455 inner circumferential surface

What is claimed is:

1. A centrifugal pendulum mountable rotatably around an axis of rotation and comprising:
a pendulum flange;
a first pendulum mass;
a second pendulum mass; and
a spring arrangement, the first pendulum mass and the second pendulum mass being positioned side-by-side in a circumferential direction, the first pendulum mass being coupled with the pendulum flange by a first slotted guide, and the second pendulum mass being coupled with the pendulum flange by a second slotted guide, the first slotted guide being designed to guide the first pendulum mass along a first oscillation path in an oscillating motion, and the second slotted guide being designed to guide the second pendulum mass along a second oscillation path in a second oscillating motion, the spring arrangement being positioned between the first and second pendulum masses in the circumferential direction, and coupling the first pendulum mass at least partially with the second pendulum mass, at least one of the first and second pendulum masses having a receptacle, the spring arrangement including at least one spring element and one protective device, the protective device being positioned at least partially in the receptacle and being separate piece from the first and second pendulum masses, the protective device separating the spring element from a floor of the receptacle.

2. The centrifugal pendulum as recited in claim 1 wherein at least one of the first and second pendulum masses includes a fastening segment extending at least partially in the circumferential direction, the protective device being designed at least partially in the form of a hollow body, the spring element at least partially surrounding the protective device circumferentially, and the protective device at least partially surrounding the fastening segment with an inner circumferential surface.

3. The centrifugal pendulum as recited in claim 2 wherein the protective device is connected positively or frictionally by the inner circumferential surface to the fastening segment.

4. The centrifugal pendulum as recited in claim 1 wherein the protective device includes a first segment and a second segment, the first segment reaching into the receptacle and providing a connection of the protective device to the receptacle, the second segment being designed at least partially in the form of a peg.

5. The centrifugal pendulum as recited in claim 4 wherein the first segment has an eyelet, the protective device has a pin and a recess is positioned in the first or second pendulum mass corresponding to the pin, the pin extending through the recess and the eyelet and connecting the protective device to the first or second pendulum mass by a positive lock.

6. The centrifugal pendulum as recited in claim 5 wherein the recess is aligned parallel to the axis of rotation.

7. The centrifugal pendulum as recited in claim 4 wherein the protective device includes a first protective element and a second protective element, wherein the first protective element has the first segment and the second segment, and wherein the second protective element is at least partially in the form of a hollow body and surrounds the second segment of the first protective element circumferentially.

8. The centrifugal pendulum as recited in claim 4 wherein the protective device includes a third segment, wherein the second segment is positioned between the first segment and the third segment in the circumferential direction, wherein the first pendulum mass includes the receptacle and the second pendulum mass includes a different receptacle positioned opposite the first pendulum mass in the circumferential direction, wherein the protective device reaches with the first segment into the receptacle and is connected to the receptacle by a positive or frictional connection, wherein the spring element surrounds the second segment circumferentially, wherein the third segment reaches into the different receptacle with free play, and is designed to enable a relative movement of the different receptacle to the third segment.

9. The centrifugal pendulum as recited in claim 1 wherein the protective device includes a transverse segment extending at least partially in a radial direction.

10. The centrifugal pendulum as recited in claim 9 wherein the transverse segment is positioned between spring element and at least one of the first and second pendulum masses in the circumferential direction.

11. The centrifugal pendulum as recited in claim 9 wherein the receptacle has a recess designed corresponding to the transverse segment and at least partially receives the transverse segment.

12. The centrifugal pendulum as recited in claim 1 wherein at least one of the first and second pendulum masses, to delimit the receptacle, has at least one bracing element positioned radially to the outside of the spring element, the bracing element having an inside surface, wherein the inside surface is positioned tangentially to an outer circumferential surface of the spring element.

13. The centrifugal pendulum as recited in claim 1 wherein the spring element at least partially surrounds the protective device circumferentially or the protective device surrounds the spring element circumferentially.

14. The centrifugal pendulum as recited in claim 1 wherein the protective device has a transverse segment positioned transversely to a longitudinal axis of the spring element.

15. The centrifugal pendulum as recited in claim 14 wherein the transverse segment is positioned between the floor of the receptacle and a longitudinal end of the spring element.

16. The centrifugal pendulum as recited in claim 1 wherein at least one of the first and second pendulum masses includes a fastening segment fixed directly to a first segment of the protective device, the protective device including a second segment separating the spring element from a floor of the receptacle.

17. The centrifugal pendulum as recited in claim 16 wherein the first segment extends inside of the spring element axially with respect to a longitudinal axis of the spring element.

18. The centrifugal pendulum as recited in claim 16 wherein the second segment extends radially outward from the first segment.

19. The centrifugal pendulum as recited in claim 16 wherein the fastening segment is received inside the protective device.

20. A centrifugal pendulum mountable rotatably around an axis of rotation and comprising:
a pendulum flange;
a first pendulum mass;
a second pendulum mass; and
a spring arrangement, the first pendulum mass and the second pendulum mass being positioned side-by-side in a circumferential direction, the first pendulum mass being coupled with the pendulum flange by a first slotted guide, and the second pendulum mass being coupled with the pendulum flange by a second slotted guide, the first slotted guide being designed to guide the first pendulum mass along a first oscillation path in an oscillating motion, and the second slotted guide being designed to guide the second pendulum mass along a second oscillation path in a second oscillating motion, the spring arrangement being positioned between the first and second pendulum masses in the circumferential direction, and coupling the first pendulum mass at least partially with the second pendulum mass, at least one of the first and second pendulum masses having a receptacle, the spring arrangement including at least one spring element and one protective device, the protective device being positioned at least partially in the receptacle,
wherein at least one of the first and second pendulum masses includes a fastening segment extending at least partially in the circumferential direction, the protective device being designed at least partially in the form of a hollow body, the spring element at least partially surrounding the protective device circumferentially, and the protective device at least partially surrounding the fastening segment with an inner circumferential surface, and wherein the protective device is connected positively or frictionally by the inner circumferential surface to the fastening segment.

* * * * *